March 16, 1965    H. ALLEMANN    3,173,210
ENGRAVING MACHINE
Filed Sept. 26, 1961    3 Sheets-Sheet 3

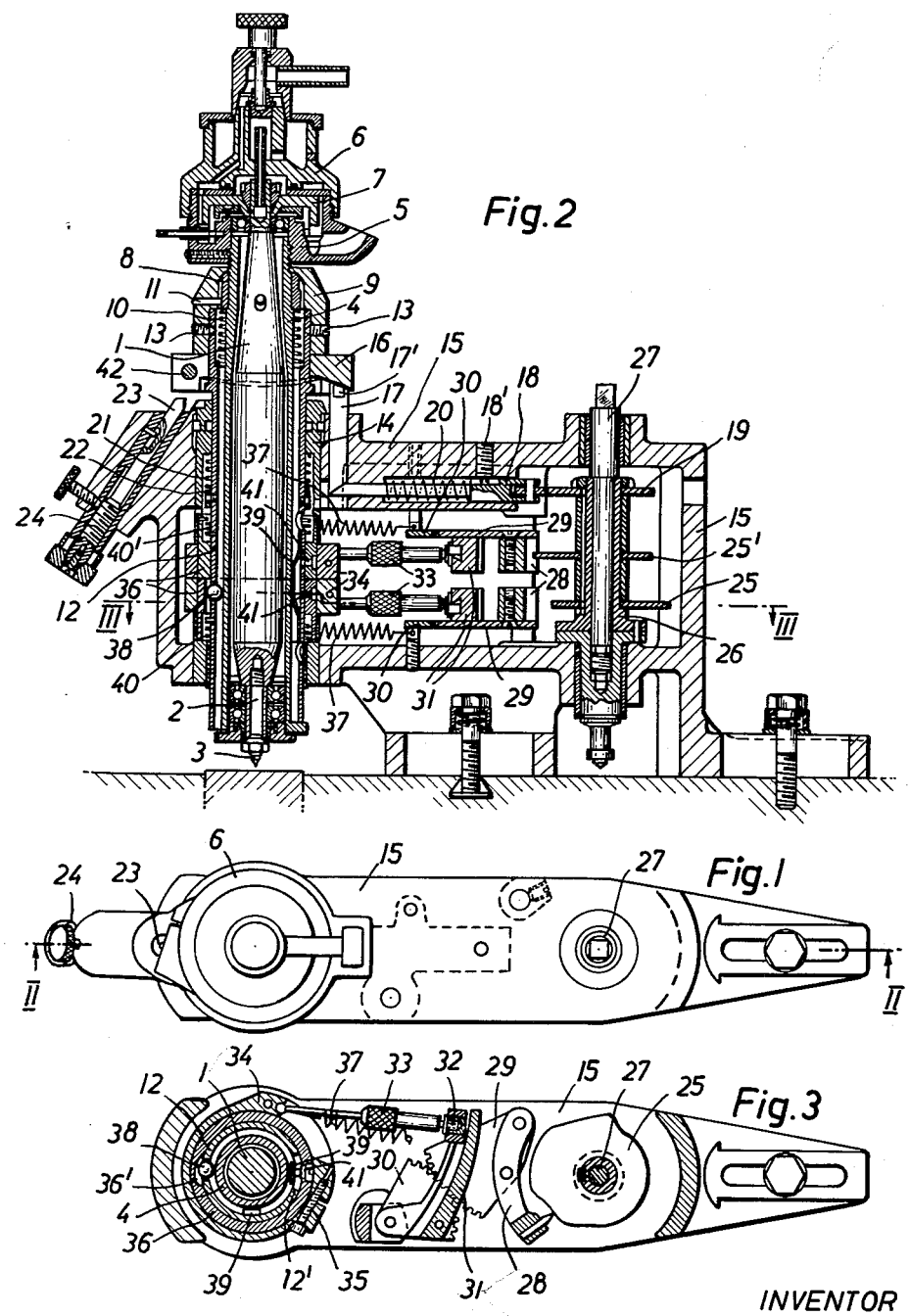

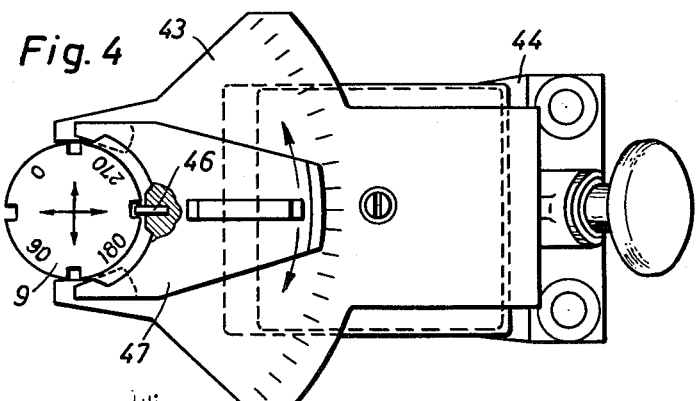
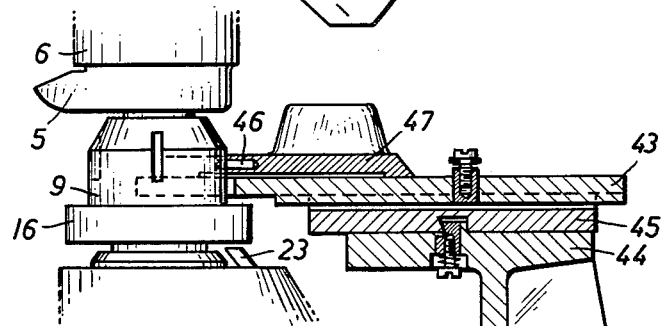
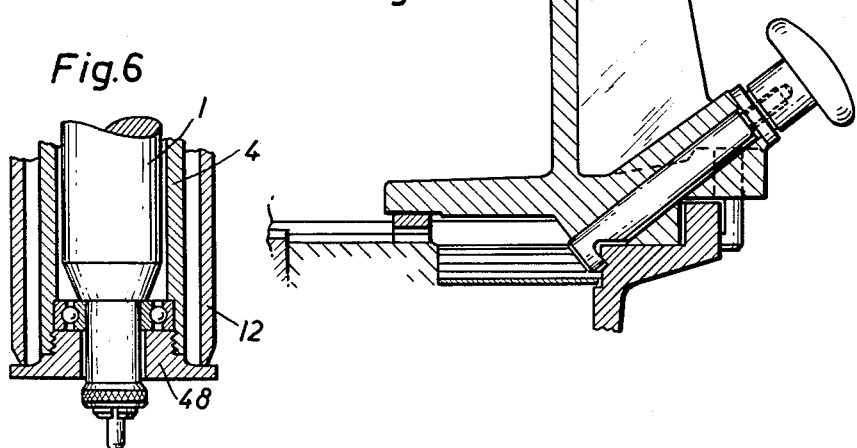

INVENTOR
Hugo Allemann
BY
Michael S. Striker
Attorney

United States Patent Office 3,173,210
Patented Mar. 16, 1965

3,173,210
ENGRAVING MACHINE
Hugo Allemann, Schaanwald-Mauren, Liechtenstein, assignor to Etablissement Allemann, Praezisions-Maschinenbau, Schaanwald-Mauren, Liechtenstein
Filed Sept. 26, 1961, Ser. No. 140,840
Claims priority, application Austria, Sept. 26, 1960,
A 7,308/60
17 Claims. (Cl. 33—18)

The present invention relates to engraving machines.

As is well known with engraving machines symbols of any desired configuration may be engraved in metallic articles, for examples. Conventional engraving machines are inconvenient to operate in that a great deal of skill is required to carry out a variety of adjustments. For example, it is necessary to adjust the elevation at which the engraving tool operates so as to control the depth of the engraving, it is necessary to adjust the orientation of the engraving with respect to the article, and of course it is also necessary to make several other adjustments such as, for example, the size of the engraving itself. In addition, a considerable amount of inconvenience is involved in carrying out operations such as changing of the engraving tool.

It is accordingly a primary object of the present invention to provide an engraving machine of the above type which is extremely convenient to operate and which is capable of rapid adjustment in order to properly carry out the engraving operation.

Another object of the present invention is to provide an engraving machine with a structure which will enable one set of controlling cams to be quickly and easily replaced by another set of controlling cams so that it is a simple matter to change from the engraving of one symbol to the engraving of another symbol.

A further object of the present invention is to provide an engraving machine of the above type with a means which while enabling the configuration of a particular symbol to be carried out by tilting of the engraving tool at the same time maintains the engraving tool at a uniform predetermined elevation so as to provide an engraving of uniform depth.

Still another object of the present invention is to provide an engraving machine of the above type with a structure which will enable the engraving machine to be very quickly adjusted so as to provide a desired orientation of the engraving on the article which is engraved.

An additional object of the present invention is to provide a structure of the above type which can be very quickly and easily set to control entirely independently of each other the width and the height of the symbol which is engraved.

Also, the objects of the invention include the provision of a structure capable of accomplishing all of the above objects and at the same time composed of extremely simple rugged elements which are very reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a top plan view of an engraving machine according to the present invention;

FIG. 2 is a sectional elevation taken along line II—II of FIG. 1 in the direction of the arrows;

FIG. 3 is a sectional plan view taken along III—III of FIG. 2 in the direction of the arrows;

FIG. 4 is a top plan view of a structure capable of being used for orienting the engraving;

FIG. 5 is a sectional elevation of the structure of FIG. 4;

FIG. 6 is a fragmentary sectional elevation of another embodiment of a structure for maintaining the engraving tool at a uniform predetermined elevation during tilting of the engraving tool;

Figure 7:
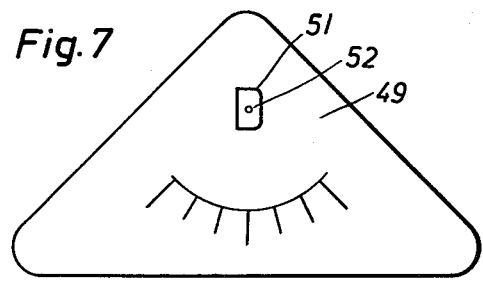
FIG. 7 is a top plan view of a completed engraved article.

Referring now to the drawings, and to FIG. 2, in particular, it will be seen that the engraving machine of the invention includes a rotary spindle means made up of the rotary spindle member 1 which carries at its bottom end an engraving tool 3 which is fixedly but removably carried by the spindle 1 by way of, for example, a collet 2 carried by the spindle 1 for rotary movement therewith and gripping the engraving tool 3 in a well known manner so that in this way the engraving tool 3 is fixed to the spindle 1 for rotary movement therewith. The rotary spindle means includes in addition to the spindle 1 itself an elongated hollow tube 4 which carries in its interior bearings, as illustrated in FIG. 2, which support the rotary spindle 1 for rotary movement within the elongated hollow tube 4. It will be seen that while the lower bearings which support the spindle 1 for rotary movement are directly carried by the tube 4, the upper bearing is carried by the member 5 which is threaded onto and fixedly connected with the tube 4 at its upper end. This member 5 which carries the upper bearing of the spindle 1 forms the lower part of an air turbine housing, the upper part 6 of this air turbine housing being threadedly connected to the lower part 5 of this housing, and this air spindle, which is of a well known structure not forming part of the present invention, includes an impeller 7 located within the housing 5, 6 for rotary movement therein and having suitable vanes, buckets, or the like to be acted upon by a stream of compressed air for rotating the impeller of the air turbine and thus rotating the spindle 1 at a high rate of speed, so that in this way the engraving tool 3 may be driven to carry out the engraving in a manner described below. The impeller 7 of the air turbine is connected to the spindle 1 so as to rotate the latter.

A means is provided to support the rotary spindle means of the invention for universal tilting movement, and this means includes an inner tubular member 8 which is fixedly carried by the tube 4 at the exterior thereof, this member 8 having at its upper end portion an outer annular surface of a suitable substantially conical configuration, and this inner member 8 is located within an outer member 9 which has an inner substantially frusto-conical guide surface cooperating with the upper end portion of the member 8, the curvature of these cooperating surfaces of the members 8 and 9 being such that irrespective of the tilting of the rotary spindle means the tool 3 will be maintained at a uniform elevation so that its point moves in a plane. In other words, the curvature of the cooperating surfaces of the elements 8 and 9 is such that the greater the degree of tilting of the spindle means 1 from a vertical position the greater the displacement of the spindle means axially so as to maintain the engraving tool 3 at a uniform elevation whereby the engraved symbol is of uniform depth. Thus, all of the parts 1–8 form a tiltable assembly which is guided for universal tilting movement by the member 9.

As is apparent from FIG. 2, the bottom end face of the member 8, which is fixed to the member 4, extends beyond the member 4 and is engaged by the upper end of a spring 10 which is coiled freely about the member 4, and this spring urges the entire tiltable assembly 1–8 upwardly so as to maintain the above-described upper end portion of the element 8 in engagement with the substantially frusto-conical surface in the interior of the member 9. The annular surface of the member 8 which cooperates with the inner substantially frusto-conical surface of the member 9 has a convex curvature in cross section, and the radius of this convex curvature cooperates which the guide surface of the member 9 to maintain the tool 3 at the desired uniform elevation irrespective of tilting of the rotary spindle means. The sleeve or tube 8 is formed at the exterior surface with an axial groove receiving the free end of a pin 11 which is carried by the member 9 so that in this way the sleeve or tube 8 together with the tube 4 to which it is fixed are prevented from rotating about the spindle axis.

FIG. 6 shows another embodiment of a structure for maintaining the engraving tool at a uniform predetermined elevation during tilting of the rotary spindle means which carries the engraving tool. According to FIG. 6, the lower end of the tube 4 in which the spindle 1 rotates threadedly carries an annular member 48 having an upper outer guide surface portion engaging the lower end of the tube 12. It will be noted that in cross section this outer upper surface portion of the member 48 has a concave curvature with the result that during tilting of the rotary spindle means within the tube 12 the annular concave upper surface portion of the member 48 will cooperate with the lower end of the tube 12 to maintain the engraving tool at the same elevation irrespective of the degree of tilting of the rotary spindle means.

The lower end of the spring 10 bears against an upwardly directed shoulder formed in the interior of an outer tube 12 within which the inner tube 4 of the rotary spindle means is located for free tilting movement. Thus, the spring 10 constantly urges the entire tiltable assembly upwardly so as to maintain the surface at the upper end portion of element 8 in engagement with the inner downwardly directed surface adjacent the upper end of the outer member 9. The upper end portion of this outer tube 12 extends into the interior of the member 9, and a plurality of screws 13 are threadedly carried by the member 9 and have free ends extending into openings of the outer tube 12 so as to fix the latter to the member 9. The outer tube 12 extends through and is slidably guided by a tube 14 which is directly carried by the frame 15 of the engraving machine, the engraving machine frame 15 being formed with an opening in which the sleeve or tube 14 is located, and the tube 12 is turnable within the sleeve 14.

The bottom end of the member 9 engages the upper surface of a clamping ring 16 which is clamped to the tube 12. At its right portion, as viewed in FIG. 2, the ring 16 is formed at its underside with a groove which receives the upper end portion of an elongated rod 17 whose bottom end bears against the left end of an elongated rod 18. This elongated rod 18 carries at its right free end portion, as viewed in FIG. 2, a freely turnable roller which engages the outer periphery of a rotary cam 19. This cam 19 forms a cam which at the beginning of an operating cycle controls the lowering of the rotary spindle means so as to place the engraving tool 3 in engagement with the work to start the engraving thereof at a selected depth, and the cam 19 while manitaining the tube 12 at a uniform predetermined elevation during the entire engraving operation will then automatically act on the rod 18 to cause the spindle means together with the tool 3 to be raised away from the work back to the idle position of the parts at the end of the operating cycle when the particular symbol to be engraved has been finished. The selected depth is maintained during the tilting of the spindle means 1, 4 due to the shape of the guide surface of stationary support member 9. Thus, shifting means are provided for moving the tool between a retracted inoperative position, and an operative engraving position. The bottom end face of the rod 17 is inclined and cooperates with an inclined left end face of the rod 18 so as the latter is shifted to the left, as viewed in FIG. 2, the rod 17 will move upwardly and will cooperate with the clamping ring 16 to raise the tube 12 upwardly and thus raise the entire tiltable assembly upwardly, while when the rod 18 shifts to the right, as viewed in FIG. 2, the rod 17 will move downwardly and the clamping ring 16 together with the entire tiltable assembly and the tube 12 will also move downwardly, this latter movement taking place at the beginning of an operating cycle. Within the frame 15, in the bore thereof which receives the rod 18, is located spring 20 coiled about the rod 18 and engaging a shoulder thereof so as to urge the rod 18 to the right, as viewed in FIG. 2, so as to maintain the rod 18 at all times in engagement with the periphery of the cam 19, and the rod 18 is formed at an upper surface portion with an axial groove receiving the bottom end of screw member 18' so that while the rod 18 can shift axially, it cannot turn above its axis. The rod 17 has at its upper end portion a pair of opposed flat surface portions 17' slidably engaging the opposed flat side surfaces of the groove in the clamping ring 16 which receives the upper end of the rod 17, and it will be noted that the upper end face of the rod 17 as well as the face of the groove of ring 16 which is engaged by the rod 17 are inclined downwardly toward the right, as viewed in FIG. 2. This latter inclination is provided so as to oppose any tendency of the rod 17, as a result of its one-sided engagement with the ring 16, to tilt and cause any jamming of the tube 12 within the sleeve 14. In other words any tendency of the tube 12 to jam in the sleeve 14 during vertical sliding movement therein is opposed and compensated for by the inclined surfaces of the groove 16 and the upper end face of the rod 17. A spring 21 is coiled about the tube 12 and is located within the sleeve 14 with its top end engaging a downwardly directed shoulder in the interior of the sleeve 14 and with its bottom end engaging the upper surface of a ring 22 which is fixed to the tube 12, so that the spring 21 urges the tube 12 downwardly and thus causes the ring 16 to press downwardly on the upper end of the rod 17, so that in this way the cooperative relationship between the elements 16 and 17 is maintained. While the tube 12 may turn about its axis within the sleeve 14 when the clamping ring 16 is loosened by loosening the bolt 42 thereof, as long as the clamping ring 16 tightly grips the tube 12 the latter is prevented from turning because of the cooperation of the rod 17 with the ring 16, this rod 17 preventing the ring 16 and thus the tube 12 therewith from turning about the spindle axis as long as the ring 16 is clamped onto the tube 12.

As will be seen from the left portions of FIGS. 1 and 2, the frame 15 slidably carries an adjusting pin 23 the upper end of which is adapted to be engaged by the ring 16 during downward movement thereof so that in this way the downward movement of the rotary spindle means and the engraving tool 3 is limited. The elevation of the stop pin 23 is controlled by a micrometer screw 24 which is capable of being turned by the operator and which engages the bottom end of the slidable stop pin 23. Thus, by turning the screw 24 the operator may adjust the elevation of the stop pin 23, and the cam 19 when it turns to lower the rotary spindle means and the engraving tool will enable all of the parts to move down until the ring 16 engages the top end of the pin 23, so that in this way the depth of the engraving made by the tool 3 may be very precisely determined.

Thus, at the beginning of each operating cycle the cam 19 will actuate the rods 18 and 17 so as to cause the rotary spindle means and the tool 3 to move down until the ring 16 engages the pin 23, and then the actual engraving takes place, and at the end of the operating cycle the cam 19 again raises the assembly to its idle position.

At this time one workpiece, which has thus been engaged, is removed and a new workpiece is placed in position to be engraved in the same way, so that in this way the operations are repeated for each of the workpieces.

Each symbol which is engraved has a set of cams 25 and 25' corresponding to the particular symbol. The cams 25 and 25' for each symbol are carried by the same sleeve 26 which carries the cam 19, so that for each pair of cams 25 and 25' corresponding to a particular symbol there is also a cam 19, and these three cams form a unitary assembly carried by the sleeve 26. A screw member 27 has a bottom threaded end extending into a threaded bore of a rotary member carried by the lower part of the frame 15 and adapted to be driven by a motor so as to control the rotation of the set of cams during each operating cycle. This screw member 27 has an elongated shank portion extending freely through the entire sleeve 26, and this sleeve 26 has adjacent its outer periphery at its bottom flange shown in FIG. 2 a bore which receives a pin which is fixed to the rotary, motor-driven member, so that with this construction the operator need only loosen and remove the screw member 27 to enable the sleeve 26 and all of the cams carried thereby to be very quickly and easily removed through either one of the open sides of the frame 15 (FIG. 3), and then a new sleeve 26 with a different set of cams is very quickly replaced and the screw 27 returned so that in this way it is possible to quickly and conveniently replace one set of cams with another set of cams.

In accordance with the present invention, and with a rotary spindle structure described in detail below, the rotary spindle means is tilted in a pair of mutually perpendicular directions for carrying out any engraving operation, and this tilting in the pair of mutually perpendicular directions is controlled by the cams 25 and 25', one of these cams controlling tilting in one direction while the other cam controls tilting in the other direction. The cams 25 and 25' transmit their rotary movement through a motion transmitting means to the pair of tilting means described below, and each of these motion transmitting means includes a lever 28 carrying at one end a knife edge or the like engaging the periphery of a particular cam 25 or 25' so that in this way as the cams rotate the levers 28 will be turned. These levers 28 are fixed, respectively, to a pair of gear sectors 29 which turn with the pair of levers 28, and the levers 28 are turnable about a common vertical axis located adjacent the end of each lever 28 distant from the portion thereof which carries the knife edge. Thus, the gear sectors 29 which turn about the same axis as the lever 28 will turn one way or the other depending upon the configuration of the cams, and these gear sectors 29 respectively mesh with a pair of gear sectors 30 of the pair of motion transmitting means. These gear sectors 30 are also supported for rotary movement about a common turning axis which is parallel to the turning axis of the gear sectors 29, and the pair of gear sectors 30 respectively fixedly carry a pair of levers 31 which are respectively slidably engaged by a pair of shoes 32 which are slidable along the levers 31 and which can be releasably fixed at any desired point along the levers 31 for a purpose described below. The shoes 32 are respectively connected pivotally, as by a ball-and-socket assembly, with a pair of elongated rod assemblies 33 of the pair of motion transmitting means, each rod assembly 33 being capable of having its length adjusted in any suitable well known manner. The ends of the pair of rod assemblies 33 distant from the shoes 32 are respectively pivotally connected, as by a ball-and-socket joint, for example, with a pair of clamping rings 34 which respectively surround and are adapted to grip a pair of rings 36 which form part of the pair of tilting means. Each of the rings 34 is split and threadedly carries a screw 35 which can be turned so as to clamp the rings 34 tightly onto the rings 36, respectively, or so as to loosen the engagement between the clamping rings 34 and the rings 36, respectively. When the clamping rings 34 are clamped onto the rings 36 it is clear that the latter rings will turn according to the turning of the levers 31, respectively. The parts 28–35 thus form a motion transmitting means transmitting the movement of each cam 25 or 25' to the tilting means part of which is formed by a ring 36, and a pair of springs 37 are respectively connected to the clamping rings 34 and to stationary pins carried by the frame 15 so as to urge the rings 34 in a clockwise direction, as viewed in FIG. 3, and in this way these springs maintain the free ends of the levers 28 in engagement with the cams 25 and 25', so that the angular positions of the rings 36 of the pair of tilting means will be determined by the configuration of the cams 25 and 25', respectively.

The rings 36 are freely turnable with respect to the tube 12 about the axis thereof, and this tube 12 cannot turn about its axis as long as the ring 16 is clamped onto the tube 12, as pointed out above. The lower ring 36 shown in FIG. 2 rests on a ring which surrounds the tube 12 and is carried by the bottom wall of the frame 15, while the upper ring 36 rests on the lower ring and extends up to the bottom end of the sleeve 14. The frame 15 is formed with a suitable free space within which the rings 34 and 36 as well as the entire transmission means between the cams and the pair of tilting means is located, as is apparent from FIGS. 2 and 3.

Each of the pair of rings 36 of the pair of tilting means is formed in its interior with a cutout 36' having the configuration shown most clearly in FIG. 3. The inner surfaces of the cutouts 36' respectively engage a pair of force-transmitting ball members 38 which are freely movable through openings formed in the tube 12, these openings being slightly larger than the diameter of the ball members 38, and these ball members 38 engage the exterior surface of the inner tube 4 which is located within the outer tube 12. As is apparent from FIG. 3 as the ring 36 shown in FIG. 3 turns in a counterclockwise direction, as viewed in FIG. 3, during counter-clockwise turning of the lever 31, the inner surface of the cutout 36' will shift the ball member 38 shown in FIG. 3 to the right, as viewed in FIG. 3, so as to tilt the tool 3 to the right, as viewed in FIGS. 2 and 3, while when the ring 36 of FIG. 3 turns in a clockwise direction a deeper part of the cutout 36' is capable of receiving the ball member 38 so that the spindle means is capable of returning toward its vertical position. The pair of cutouts 36' of the pair of rings 36 are displaced by 90° one with respect to the other, and of course the pair of ball members 38 are also displaced by 90° one with respect to the other, so that the pair of tilting means 36, 38 provide tilting of the rotary spindle means in a pair of mutually perpendicular directions. The tube 12 carries in its interior a pair of leaf springs 39 which are also displaced with respect to each other by 90° and which are respectively located opposite the pair of cutouts 36' so that these leaf springs 39 guarantee returning of the spindle means 1 toward its vertical position as deeper parts of the cutouts 36' become aligned with the pair of ball members 38, respectively. Because of the mutually perpendicular directions of tilting provided by the pair of tilting means of the invention, it is possible with this pair of tilting means to direct the engraving tool 3 to any desired part of the working field.

Each of the rings 36 fixedly carries a screw member 41 (FIGS. 2 and 3) and these screw members 41 respectively extend into slots 12' formed in the tube 12. Also, a spring 40 is coiled about the tube 12 and has its opposite ends respectively connected to the lower ring 36 and the tube 12, while a spring 40' is coiled about the tube 12 and has its opposite ends connected to the tube 12 and the upper ring 36, so that these springs 40 and 40' will, when the clamping screws 35 are loosened, turn the rings 36 in a clockwise direction, as viewed in FIG. 3, to initial positions where the screws 41 respectively engage one end of the slots 12', and in this way the rings 36 are located in their starting angular positions with respect to the tube 12.

If, in addition to loosening of the screws 35, the screw 42 is also loosened so as to loosen the clamping ring 16, then the entire tiltable assembly together with the outer tube 12 and the tube 9 can be angularly turnable about the spindle axis as one unit, so that in this way it is possible to orient the direction of the engraving with respect to the article which is engraved. With this arrangement it is possible to make this angular orientation through 360° so that the symbol which is to be engraved can extend in any desired direction.

In order to carry out this angular adjustment, the structure shown in FIGS. 4 and 5 is provided. This structure includes an upper carriage 43 which is longitudinally movable to the right and left, as viewed in FIGS. 4 and 5, and this upper carriage is itself carried by a lower carriage 45 which is shiftable perpendicularly with respect to the direction of shifting of the carriage 43 which is of course itself carried by the carriage 45. Thus, the carriage 43 is shiftable on the carriage 45 toward and away from the axis of the spindle while the lower carriage 45 is shiftable laterally with respect to the spindle, and this lower carriage 45 is carried by a supporting frame 44 adapted to be removably connected in any suitable way to the frame 15. The upper carriage 43 is formed at its left end, as viewed in FIGS. 4 and 5, with a cutout adapted to receive the member 9, so that by cross-wise shifting of the carriage 43 through the lower carriage 45 and by movement of the carriage 43 toward the spindle it is possible to accurately locate the member 9 within the cutout at the left end of the carriage 43. A pointer member 47 is carried by the upper surface of the carriage 43, in slidable engagement with this upper surface, and this pointer member 47 fixedly carries a pin 46 adapted to be selectively placed in one of four axial slots or grooves formed in the exterior of the member 9, these four grooves being distributed uniformly about the axis of the member 9 so as to be spaced from each other by 90°. With the member 47, which has the configuration shown in FIG. 4, placed with its pin 46 in one of the grooves of the member 9, it is possible to turn the member 46 and thus the member 9 therewith so that the entire tiltable assembly together with the sleeve 12 can be turned until the pointer member 47 is aligned with one of the graduations carried by the upper face of the carriage 43, as shown in FIG. 4, and these graduations provide suitable sub-divisions of a 90° angle so that it is possible in this way to very accurately provide an angular orientation of the spindle means for any quadrant of the member 9. The four quadrants of the member 9 may carry the indicia indicated in FIG. 4 so that in this way a selected quadrant may be located in a selected angular position and then the pin 46 placed in a selected corresponding groove so that further orientation may be provided in this way. Once the orientation is adjusted the screws 42 and 35 are tightened, and of course what has been accomplished by this orientation is to select the particular pair of mutually perpendicular tilting directions for the rotary spindle means so as to orient in this way the symbol which will be engraved.

As was pointed out above the shoes 32 are respectively slidable along the levers 31, so that in accordance with the selected positions of these shoes 32 along the levers 31, the lever arms acting through the rod assemblies 33 on the rings 34 and thus on the rings 36, respectively, will be regulated, so that in this way it is possible to control the size of the engraving. Thus, by choosing a particular position of the selected shoe along the lever 31 it is possible to control, for example, the height of the symbol made by the engraving machine, while choosing the position of the other of the shoes along the lever 31 which carries it will control the width of the symbol, and it is thus possible to have any desired combination of width and height of the particular symbol which is provided by the pair of cams 25 and 25'.

Figure 8:
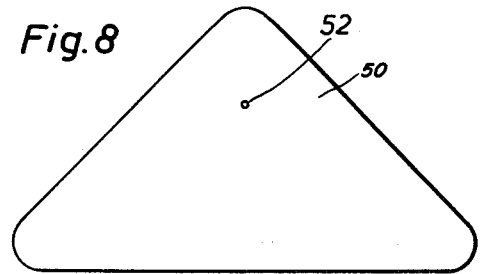
FIG. 8 is a top plan view of an adjusting member used for setting the engraving machine prior to the actual making of an engraving as illustrated in FIG. 7.

Before starting the engraving process, the machine is adjusted with respect to the workpiece which is clamped on the work surface which carries the machine itself, as shown at the lower portion of FIG. 2, and in order to position the engraving machine a template 50 as shown in FIG. 8 having a configuration the same as that of the workpiece 49 shown in FIG. 7 is provided. Assuming that the symbol 51 shown in FIG. 7 is to be engraved, there will be a center 52 which is centrally located with respect to the outermost points of the symbol to be engraved, and the template 50 is provided with a punch mark 52 corresponding to the location of this central point of the symbol which is to be engraved. With the clamping rings 34 loosened so that the spindle means 1 will be perfectly vertical, the axis of the spindle is brought into alignment with the punch mark 52 on the template 50, and in this way the machine is properly positioned with respect to the workpiece.

Once the machine is properly positioned with respect to the punch mark, the orientation of the engraving with respect to the workpiece can be adjusted in the manner described above with the construction shown in FIGS. 4 and 5, the screws 42 and 34 being loosened for this purpose, and after this orientation is made these screws are again tightened. Then the set of cams 19, 25, 25' corresponding to the desired symbol is set into the machine in the manner described above, and of course the position of the shoes 32 is adjusted to provide the desired height and width of the engraving.

Inasmuch as the engraving machine and all of its parts will remain in the adjusted positions and inasmuch as the workpiece is always placed in the same position relative to the engraving machine, it is possible once the machine is set for the first workpiece, to maintain all of the settings and to very rapidly make the engravings on a large number of identical workpieces.

In order to change the engraving tool 3, the screws 13 are removed so that the element 9 can be shifted upwardly with respect to the tube 12, the spring 10 expanding at this time so as to raise the entire tiltable assembly together with the member 9, and this tiltable assembly at this time will be located at an elevation sufficiently high to enable the operator to have free access to the collet 2 so as to remove one tool 3 and replace it with another.

The tube 12 of course remains at the elevation it had before the screws 13 were removed because the clamping ring 16 which is clamped to the tube 12 rests on the rod 17. After the tool is replaced the member 9 is pushed downwardly along the tube 12 together with the entire tiltable assembly until the screws 13 can again be replaced to connect the parts in the position shown in FIG. 2.

It will be understood that each of the elements described above, or two or more together, may also find a useful application in other types of engraving machine differing from the types described above.

While the invention has been illustrated and described as embodied in adjustable engraving machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an engraving machine, in combination, an elongated spindle adapted to carry an engraving tool; an inner tube in which said elongated spindle is located; bearing means carried by said inner tube and cooperating with said spindle to support the latter for rotary movement; support means cooperating with said inner tube to support the latter for tilting movement in all directions and including a stationary support member; an outer elongated tube in which said inner tube is tiltable together with said spindle, said outer tube being secured to said stationary support member and having openings therethrough; a pair of tilting means carried by said outer tube and cooperating with said inner tube for tilting the latter and said spindle therewith in a pair of mutually perpendicular directions, said pair of tilting means respectively including a pair of rings surrounding and turnable with respect to said outer tube and having inner cam faces, force-transmitting means located in said openings and engaging said cam faces and said inner tube, and a pair of clamping rings respectively surrounding and clamped to said pair of rings which surround and are turnable with respect to said outer tube; control means for controlling the tilting of said inner tube; and motion transmitting means cooperating with said control means and with said pair of clamping rings for turning the latter and said rings surrounding said outer tube therewith in accordance with the movement of said control means whereby said cam faces and force-transmitting means cause tilting of said inner tube and of said spindle.

2. In an engraving machine, in combination, an elongated spindle adapted to carry an engraving tool; an inner tube in which said elongated spindle is located; bearing means carried by said inner tube and cooperating with said spindle to support the latter for rotary movement; support means cooperating with said inner tube to support the latter for tilting movement in all directions and including a stationary support member; an outer elongated tube in which said inner tube is tiltable together with said spindle, said outer tube being secured to said stationary support member and having openings therethrough; a pair of tilting means carried by said outer tube and cooperating with said inner tube for tilting the latter and said spindle therewith in a pair of mutually perpendicular directions, said pair of tilting means respectively including a pair of rings surrounding and turnable with respect to said outer tube and having inner cam faces, force-transmitting means located in said openings and engaging said cam faces and said inner tube, a pair of spring means respectively cooperating with said pair of rings for turning the latter to predetermined rest positions, and stop means cooperating with said pair of rings and said outer tube for determining the rest positions of said pair of rings, said pair of rings when in said rest position thereof also determining through the remainder of said pair of tilting means the rest position of a tool carried by said spindle; and means for turning said clamping rings with said surrounding rings whereby said cam faces and force-transmitting means cause tilting of said inner tube and of said spindle.

3. In an engraving machine, in combination, spindle means adapted to carry an engraving tool; means connected with said spindle means for tilting the latter; and support means for supporting and guiding said spindle means, said support means including a first member mounted on said spindle means for tilting movement therewith, a second member having a slanted guide face in contact with said first member, and spring means abutting said member and said spindle means for holding said first member in contact with said guide face, said guide face cooperating with said first member and having a shape for maintaining said engraving tool at a uniform elevation during tilting movement of said spindle means.

4. In an engraving machine, in combination, spindle means adapted to carry an engraving tool; means connected with said spindle means for tilting the latter in two mutually perpendicular directions; and support means for supporting and guiding said spindle means, said support means including a first annular member mounted on said spindle means for tilting movement therewith, a second outer annular member having a slanted guide face in contact with, and surrounding said first annular member and cooperating with the same and having a shape for maintaining said engraving tool at a uniform elevation during tilting movement of said spindle means, and means for holding said first annular member in contact with said guide face.

5. In an engraving machine, in combination, spindle means adapted to carry an engraving tool; means connected with said spindle means for tilting the latter in two mutually perpendicular directions; and support means for supporting and guiding said spindle means, said support means including a first annular member mounted on said spindle means at the end remote from said engraving tool for tilting movement therewith and having an outer annular guide face, a second member having a substantially frusto-conical concave guide face in contact with, and surrounding said annular guide face cooperating with the same and having a shape for maintaining said engraving tool at a uniform elevation during tilting movement of said spindle means, and means for holding said first annular member in contact with said guide face.

6. In an engraving machine, in combination, spindle means including a rotary spindle having one end portion adapted to carry an engraving tool, and a first tube surrounding said spindle and supporting the same for rotation; means connected with said spindle means for tilting the latter; and support means for supporting and guiding said spindle means, said support means including an elongated second tube in which said spindle means is mounted for tilting movement, an annular member secured to said first tube and having an annular concave guide face in sliding engagement with one end of said second tube and having a shape for maintaining said engraving tool at a predetermined elevation during tilting of said spindle means, said annular member having a central opening through which said end portion of said spindle carrying the engraving tool passes, and means for holding said spindle means in a position in which said guide face is in sliding engagement with said second tube.

7. In an engraving machine, in combination, spindle means including a spindle adapted to carry an engraving tool, and an inner tube rotatably supporting said spindle; means supported on said inner tube and connected to said spindle for rotating the same; an annular member mounted on said inner tube and having an annular guide face; a support member including an outer tube surrounding said inner tube and having an inner shoulder, said support member having a concave substantially frusto-conical guide face in contact with said annular guide face of said annular member; spring means abutting said shoulder and said annular member for urging said annular guide face into contact with said frusto-conical guide face so that said spindle means is supported for tilting movement in said outer tube in such a manner that said engraving tool is maintained at a uniform elevation in all tilted positions of said spindle means; means for urging said support member, and thereby said spindle means to move in longitudinal direction of said spindle means so that said tool is moved to an engraving position; and tilting means operatively connected to said inner tube for tilting said spindle means.

8. In an engraving machine, in combination, spindle means including a spindle adapted to carry an engraving tool, and an inner tube rotatably supporting said spindle; means supported on said inner tube and connected to said spindle for rotating the same; an annular member mounted on said inner tube and having an annular guide face; a support member including an outer tube surrounding said inner tube and having an inner shoulder, said outer tube having at least one opening therethrough, said support member having a concave substantially frusto-conical guide face in contact with said annular guide face of said annular member; spring means abutting said shoulder and said annular member for urging said annular guide face into contact with said frusto-conical guide face so that said spindle means is supported for tilting movement in said outer tube in such a manner that said engraving tool is maintained at a uniform elevation in all tilted positions of said spindle means; means for urging said support member, and thereby said spindle means to move in longitudinal direction of said spindle means so that said tool is moved to an engraving position; and tilting means operatively connected to said inner tube for tilting said spindle means, said tilting means including a ring surrounding said outer tube and being turnable on the same, said ring having an inner cam face, force-transmitting means located in said opening and engaging said cam face and said inner tube, and means for turning said ring on said outer tube whereby said cam face and force-transmitting means cause tilting of said inner tube and of said spindle.

9. In an engraving machine, in combination, spindle means adapted to carry an engraving tool; support means supporting and guiding said spindle means for tilting movement; and tilting means for tilting said spindle means and including at least one ring mounted on said support means for turning movement and surrounding said spindle means, said ring having an inner cam face, force-transmitting means in engagement with said cam face and said spindle means and moving in radial direction during turning movement of said ring for tilting said spindle means, and means for turning said ring.

10. In an engraving machine, in combination, spindle means adapted to carry an engraving tool; support means supporting and guiding said spindle means for tilting movement; and tilting means for tilting said spindle means and including at least one ring mounted on said support means for turning movement and surrounding said spindle means, said ring having an inner cam face, force-transmitting means in engagement with said cam face and said spindle means and moving in radial direction during turning movement of said ring for tilting said spindle means, at least one clamping means for clamping said ring and adapted to be clamped to the same in different angular positions of said spindle means and of said ring, and means for turning said clamping means whereby said spindle means is tilted in different directions according to the angular position of said ring and of said cam face.

11. In an engraving machine, in combination, spindle adapted to carry an engraving tool; support means supporting and guiding said spindle means for universal tilting movement; and tilting means for tilting said spindle means in two mutually perpendicular directions, and including two rings mounted on said support means for turning movement and surrounding said spindle means, each said ring having an inner cam face, said cam faces being angularly spaced from each other an angle of 90 degrees, two force-transmitting means in engagement with said cam faces, respectively, and with said spindle means and moving in mutually perpendicular radial directions during turning movements of said ring for tilting said spindle means in two mutually perpendicular directions, and two control means respectively connected to said rings for independently turning the same with the respective ring.

12. In an engraving machine, in combination, spindle means adapted to carry an engraving tool; support means supporting and guiding said spindle means for universal tilting movement; and tilting means for tilting said spindle means in two mutually perpendicular directions, and including two rings mounted on said support means for turning movement and surrounding said spindle means, each said ring having an inner cam face, said cam faces being angularly spaced from each other in an angle of 90 degrees, two force-transmitting means in engagement with said cam faces, respectively, and with said spindle means and moving in mutually perpendicular radial directions during turning movements of said ring for tilting said spindle means in two mutually perpendicular directions, a pair of clamping means respectively embracing said rings and adapted to be clamped to the same in different angular positions of said spindle means and of said rings, and two control means respectively connected to said clamping means for independently turning the same with the respective ring whereby said spindle means is tilted in different directions.

13. In an engraving machine, in combination, spindle means adapted to carry an engraving tool; support means supporting and guiding said spindle means for universal tilting movement; and tilting means for tilting said spindle means in two mutually perpendicular directions, and including two rings mounted on said support means for turning movement and surrounding said spindle means, stop means limiting relative turning movement between said spindle means and each ring and spring means urging said spindle means to a position abutting said stop means, each said ring having an inner cam face, said cam faces being angularly spaced from each other an angle of 90 degrees, two force-transmitting means in engagement with said cam faces, respectively, and with said spindle means and moving in mutually perpendicular radial directions during turning movements of said ring for tilting said spindle means in two mutually perpendicular directions, a pair of clamping means respectively embracing said rings and adapted to be clamped to the same in different angular positions of said spindle means and of said rings, two control cams; and connecting means including cam followers cooperating with said control cams, respectively, and being connected with said clamping means for independently turning the same with the respective ring whereby said spindle means is tilted in different directions.

14. In an engraving machine, in combination, spindle means adapted to carry an engraving tool; support means supporting and guiding said spindle means for universal tilting movement, said support means including a first annular member mounted on said spindle means for tilting movement therewith, a second annular member having a concave annular guide face in sliding contact with said first annular member, and spring means abutting said member and said spindle means for holding said first member in sliding contact with said guide face, said guide face having such a substantially frusto-conical shape so as to maintain said engraving tool at a uniform elevation during tilting movement of said spindle means; and tilting means for tilting said spindle means in two mutually perpendicular directions, and including two rings mounted on said support means for turning movement and surrounding said spindle means, stop means limiting relative turning movement between said spindle means and each ring and spring means urging said spindle means to a position abutting said stop means, each said ring having an inner cam face, said cam faces being angularly spaced from each other an angle of 90 degrees, two force-transmitting means in engagement with said cam faces, respectively, and with said spindle means and moving in mutually perpendicular radial directions during turning movements of said ring for tilting said spindle means in two mutually perpendicular directions, a pair of clamping means respectively embracing said rings and adapted to be clamped to the same in different angular positions of said spindle means and of said rings, two control cams; and connecting means including cam followers cooperating with said control cams, respectively, and being connected with said clamping means for independently turning the same with the respective ring whereby said spindle means is tilted in different directions.

15. An engraving machine as set forth in claim 14 and including a clamping ring for clamping and supporting said stationary member in a plurality of angularly turned positions; and shifting means for moving said clamping ring with said stationary member between a retracted position in which said tool is inoperative and an advanced position in which said tool is operative at said elevation.

16. An engraving machine as set forth in claim 15, wherein said shifting means includes a cam, and including mounting means for mounting said last mentioned cam and said control cams so that said cams form a unit adapted to be exchanged.

17. An engraving machine as set forth in claim 16, wherein said force-transmitting means are balls; and wherein said stationary member includes a tube surrounding said spindle means along the length of the same and having openings supporting said balls for turning movement, said rings being mounted on said tube on the region of said openings and balls.

References Cited by the Examiner
UNITED STATES PATENTS

| | | | |
|---|---|---|---|
| 517,680 | 4/94 | Chase | 90—13.1 |
| 963,559 | 7/10 | Hines | 33—174 |
| 972,920 | 10/10 | Riggs | 33—18 X |
| 2,300,698 | 11/42 | Pentz | 33—18 |
| 2,734,272 | 2/56 | Brown | 33—27 |

FOREIGN PATENTS

| | | |
|---|---|---|
| 222,716 | 10/24 | Great Britain. |
| 356,492 | 9/31 | Great Britain. |

ISAAC LISANN, *Primary Examiner.*